United States Patent

[11] 3,631,384

| [72] | Inventor | Noyes D. Smith, Jr. |
| --- | --- | --- |
| | | Bellaire, Tex. |
| [21] | Appl. No. | 813,503 |
| [22] | Filed | Apr. 4, 1969 |
| [45] | Patented | Dec. 28, 1971 |
| [73] | Assignee | Shell Oil Company |
| | | New York, N.Y. |

[54] SEISMIC HOLOGRAPHY
9 Claims, 12 Drawing Figs.

[52] U.S. Cl. ..................................................340/15.5 DS,
340/15.5 SC, 350/3.5
[51] Int. Cl. ........................................................ G01v 1/34
[50] Field of Search............................................ 340/15.5
SC, 15.5 DS; 350/3.5

[56] References Cited
OTHER REFERENCES

Dobrin et al., Velocity and Frequency Filtering of Seismic Data Using Laser Light, 30 Geophysics 1144– 1178, Dec. 1965

Primary Examiner—Rodney D. Bennett, Jr.
Assistant Examiner—Daniel C. Kaufman
Attorneys—Theodore E. Bieber and John H. McCarthy ABSTRACT: A method for processing seismic data wherein seismic arrival time-distance sections are produced from seismic data traces received at points located along lines through an areal array of receivers, at least one signal corresponding to a reference wave being combined with each section, visible strips of one-dimensional Fourier transforms relating to a selected frequency of each seismic section being optically produced from each section and the visible strips arranged as the sections were arranged in the original array with the so-arranged strips being illuminated with coherent light to produce a three-dimensional visible display of the acoustic images resulting from the reflection and diffraction of seismic energy from subterranean structures.

INVENTOR:
NOYES D. SMITH, JR.
BY:
HIS ATTORNEY

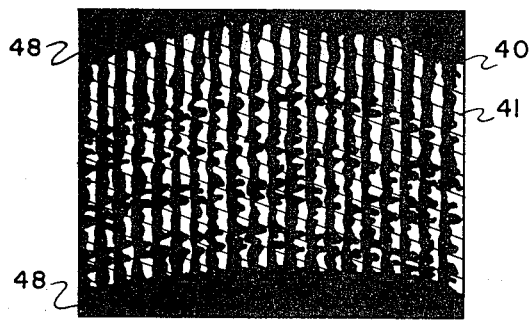
FIG. 7 a
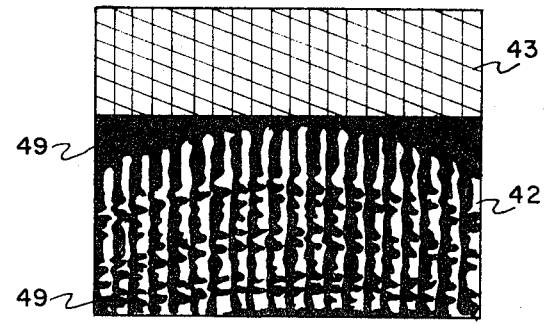
FIG. 7 b
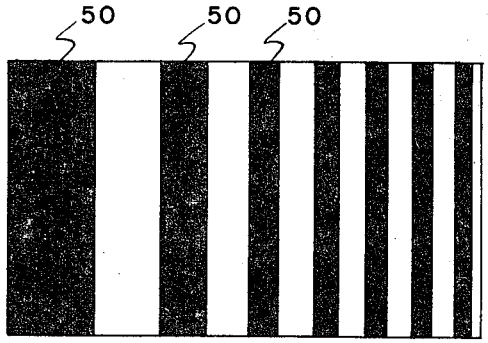
FIG. 8
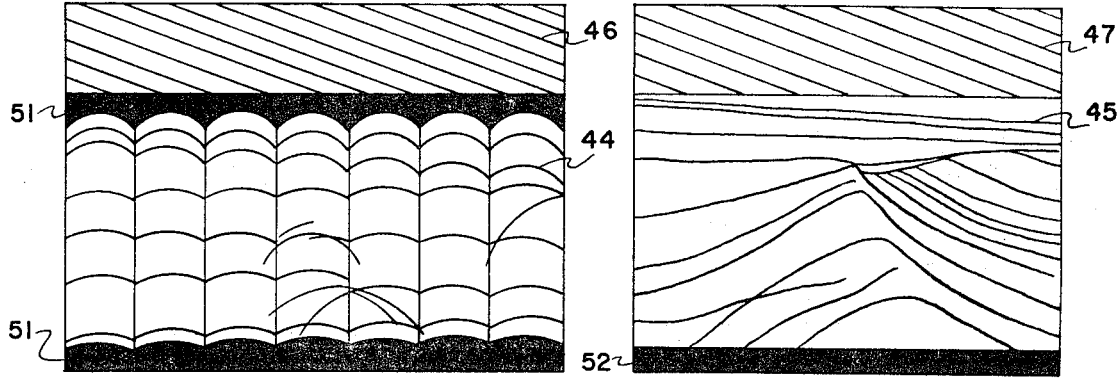
FIG. 9 a
FIG. 9 b
INVENTOR:
NOYES D. SMITH, JR.
BY:
HIS ATTORNEY

SEISMIC HOLOGRAPHY

RELATED APPLICATION

The present application is related to a copending application entitled "Producing Acoustic Holograms," filed Dec. 7, 1967, Ser. No. 688,920 by S. P. Cook.

BACKGROUND OF THE INVENTION

The above-referenced copending application describes a method for forming a three-dimensional holographic display of seismic data. For example, it describes a method for obtaining a three-dimensional display of the data that is obtained using dynamite as a source and recording the reflected and diffracted seismic waves at a large number of geophones.

The process described in the copending patent application is effective but has the disadvantage of requiring a relatively large amount of computation time. For example, when that process is applied to the seismic data provided by a dynamite shot into an areal array of geophones, a hologram is found by the steps of:

1. Fourier-analyzing each geophone trace to produce an analyzed signal that depicts the amplitudes and phases of a selected frequency;
2. summing each of the analyzed signals with a reference wave signal that has the selected frequency with an amplitude and phase that corresponds to each distance between the shot and each geophone;
3. squaring each of the summed signals; and
4. producing a visible display in which the intensities of the squared signals are depicted in locations that are positioned within the display as the geophones were positioned within the array of geophones.

SUMMARY OF THE INVENTION

The present invention provides a process by which holograms can be formed with relatively small amounts of computation time. It is applicable to substantially any type of seismic data that indicates the amplitude as a function of arrival time at which seismic waves appear at each station of an areal array of seismic-receiving stations toward which the seismic waves have been diffracted and reflected from a subterranean structure. The present invention utilizes optical seismic data-processing techniques to simultaneously process large portions of data. In the present process, an areal array of seismic-receiving stations is, in effect, treated as a plurality of parallel linear arrays of receiving stations from each of which the $t-x$ seismic data is simultaneously displayed and optically processed in the form of seismic section displays.

In a seismic section display the $t-x$ data comprises a display in which the amplitude with time of the seismic waves appearing at each of a line of seismic-receiving stations is depicted along one coordinate while the order and spacing of the seismic-receiving stations with distance along the line is depicted along an orthogonal coordinate.

When the process of the present invention is applied to the seismic data produced by a dynamite shot into an areal array of geophones, a hologram is formed by the steps of:

1. producing a plurality of annotated seismic section displays that each depict both the $t-x$ data of a seismic section along a line of geophones within the array of geophones and the amplitudes and phases at which a reference wave would appear at the geophones in each of the lines of geophones;
2. diffracting parallel coherent light from each of the annotated section displays through lenses arranged to form a one-dimensional Fourier transform along the time dimension; and
3. producing from said Fourier transforms a visible display in which the intensity with respect to a selected frequency with distance along the line of geophones from which each Fourier transform was formed is depicted along one coordinate and the order and spacing of the lines of the geophones is depicted along an orthogonal coordinate.

In general, in accordance with this invention a reconstructed image of holographically displayed wave-energy data is produced by:

1. producing a visible display that depicts along one coordinate (a) the amplitude with time of appearances at a line or receiving stations of waves which are diffracted and reflected toward those receiving stations from an object, and (b) the amplitude and phase with time of appearances of the same receiving stations of a reference wave of the same form of wave energy and depicts along an orthogonal coordinate the order and spacing of said receiving stations with distance along said line of receiving stations;
2. diffracting parallel, coherent light from said display through a focusing means arranged to form a one-dimensional Fourier transform along the time dimension;
3. producing a visible display of said one-dimensional Fourier transforms with respect to a selected frequency; and
4. diffracting parallel, coherent light from said Fourier transform display.

Where the display is produced from a plurality of adjacent seismic sections, the image space that is reconstructed is three dimensional and the reconstructed images correspond to images of the source in a portion of a subterranean structure disposed to reflect and diffract seismic waves toward the area covered by the lines of the seismic sections.

A display can be constructed from one or several sections or profiles instead of a large number of adjacent sections. Two important cases are (1) a single section, from which the reconstructed images lie in a plane and (2) two sections intersecting with a large angle between them, from which the reconstructed images will be in three dimensions. In each of these cases the images of a point source will be distorted by the diffraction pattern of the slits corresponding to the boundary edge of the holographic strip used to construct the hologram.

Each of the above types of holographic displays provide valuable information in the exploration of subterranean earth formations.

In general, the wave energy that is used in the present process can be substantially any form of wave energy, such as seismic, sonar, ultrasonic, radar, magneto-hydrodynamic or other wave types including surface or boundary-layer waves for examining plane geometrics. The object or surface from which a display is produced can be any that is adapted to reflect and diffract the waves and is surrounded by a medium through which those waves can propagate.

In addition to providing a method by which a holographic display can be produced with a relatively small amount of computation time, the present invention provides a process by which images of the same object as illuminated by reference waves that emanate from a differently located source position can readily be reconstructed from the same field data. For example, with respect to seismic data, this is accomplished by merely changing the curvature of the depiction of the reference wave arrivals or phases on the annotated seismic section display.

BRIEF DESCRIPTION OF THE DRAWING

The invention will be more easily understood from the following detailed description of a preferred embodiment when taken in conjunction with the attached drawings in which;

FIGS. 7a and 7b are examples of annotated seismic section 10 displays that can be used in the present process;

FIG. 8 is an example of a hologram comprising duplication of a Fourier transform of a single annotated seismic section display; and FIGS. 9a and 9b are examples of annotated seismic section displays, with and without moveout corrections, that can be used in the present process.

DESCRIPTION OF A PREFERRED EMBODIMENT

Figure 1:
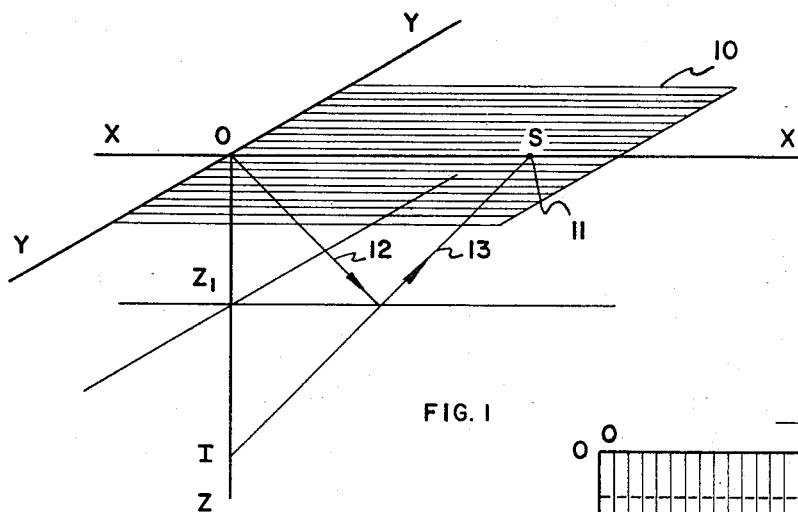
FIG. 1 is a simplified diagram showing a method used to obtain seismic data.

To understand the method of the present invention, the following discussion will be limited to the consideration of a single reflected wave arriving at an array of geophones as shown in FIG. 1. More particularly, an impulse source is located at the origin of a right-hand coordinate system and the geophones are disposed in the X-Y plane. The source may be a typical dynamite source or other impulsive type of source such as a gas exploder, air gun, etc. The process can be applied to time-distance records produced by a correlation process from swept-frequency sources. The geophone array is located along a series of lines 10 parallel with the X-axis of the coordinate system. It is assumed that the waves generated by the impulse are reflected from a reflecting plane which is located parallel to the X-Y plane and passes through the point $Z_1$. Further, the wave is assumed to travel downwardly along the path 12 and upwardly along the path 13 to the geophone located at a point 13 along the X-axis. The image of the reflected wave will occur at a point I located on the Z-axis a distance $2Z_1$ below the origin of the impulse. The arrival time of an impulse reflected to the geophones will be $$t_s = \frac{\sqrt{X^2 + Y^2 + 4Z_1^2}}{V}$$

or $r/V$, where $V$ is the velocity of the propagation of the seismic waves through the formation.

Figure 2:
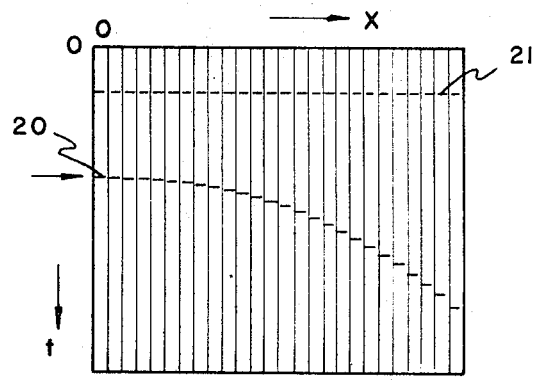
FIG. 2 is a schematic illustration of an annotated seismic section display in a form that can be used in the present process.

FIG. 2 is a schematic illustration of an annotated seismic section display of data obtained from the geophones along the line X of FIG. 1. The $t-x$ data from the geophones is depicted by the segmented line 20. The amplitudes and phases at which a reference seismic plane wave that is parallel to the X-Y plane would appear at the same geophones are depicted by the line 21.

In practicing the present invention, visible displays are produced relative to the geophones located along a series of lines, such as lines 10, within the areal array of geophones. In general, the shape and spacing of such lines and the distribution of such receiving stations can be irregular, with corrections being introduced to compensate for the irregularities. In a preferred procedure, the lines are straight, parallel and equally spaced and the receiving stations are equally spaced.

The annotated seismic section displays can be produced by means of conventional seismic data-processing equipment and techniques. The data is preferably processed to introduce corrections for localized variations in the earth formations adjacent to the receiving stations, such as weathering, elevation and the like factors which tend to introduce undesired time shifts. Conveniently the displays can be produced in the form of conventionally sized variable density or variable area displays and reduced photographically, for example to a size in the order of one twenty-fifth of the conventional size, to facilitate the optical processing. In general, with respect to a display size that is convenient for optical processing, the scale is such that one second of seismic travel time is represented by a distance along the display of from about 0.1 to 0.2 inch.

Figure 3:
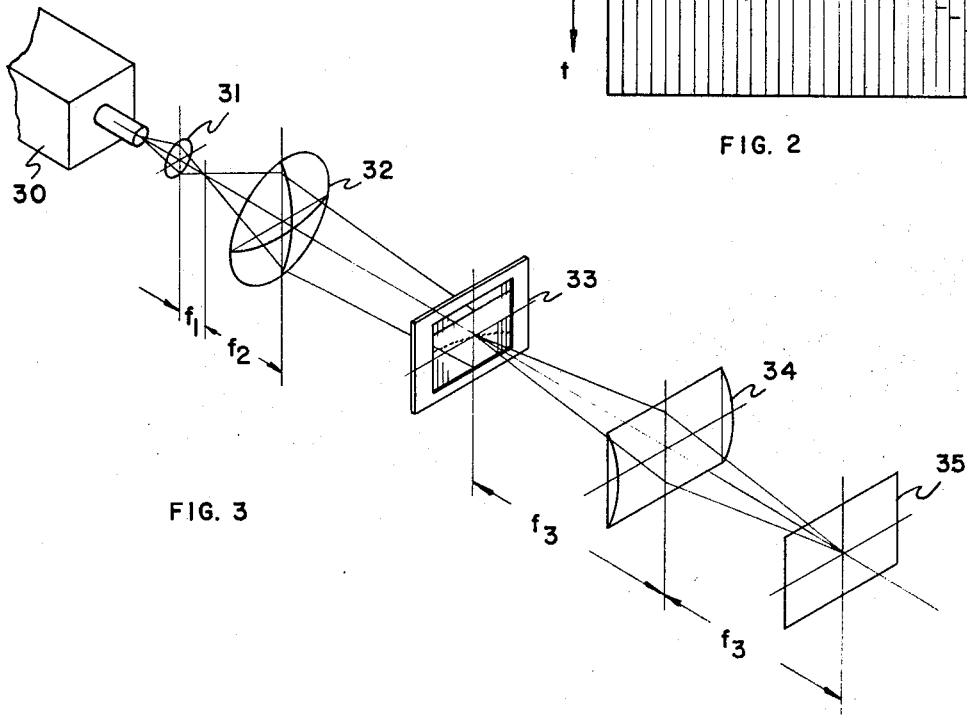
FIG. 3 is a simplified diagram of the system used for performing the optical transform.

In practicing this invention with visible displays of the reference line-annotated $t-x$ data of seismic sections with displays in the form of photographic transparencies, each transparency is processed as shown in FIG. 3 wherein the transparency 33 is illuminated with a parallel beam of coherent light from a source 30. Source 30 may be a conventional laser-type light such as a helium-neon gas that is focused by means of a short-focus spherical lens 31 and a long-focus spherical lens 32. The light that passes through the transparency is focused in one dimension by means of a long-focus cylindrical lens 34 onto a plane 35. The axis of the cylindrical lens is placed parallel with the X-axis of the transparency.

As is well known to those skilled in the art, when parallel coherent light is passed through a transparency placed in the focal plane of a cylindrical lens, a one-dimensional Fourier transform of the transparency will be formed in the opposite focal plane of the cylindrical lens. The spatial frequency of each time trace will appear as a vertical line corresponding to the X-location of the geophone whose signal forms the trace of the transparency. Further, the phase of each frequency will be shifted an amount corresponding to the arrival of the pulse and consequently on each vertical trace there will be an interference pattern of the reflected pulse and the reference pulse. For simplicity the optical processor in FIG. 3 shows the Fourier plane at the focus of the cylindrical lens. Practically, an astigmatic system, for example the apparatus through plane $P_2$ as shown in FIGS. 7–19, page 169, *Introduction to Fourier Optics* by J. W. Goodman, McGraw-Hill (1968), is often used.

If one assumes that the reference and signal of interest can be represented as delta functions of time such as $$A_R(t) = A_R \Delta(0) \quad (1)$$

and $$A_S(t) = A_S \Delta(t_S) \quad (2)$$

then the signal at any point can be represented by $$A(t) = A_R(t) + A_S(t) \text{ or } A_R \Delta(0) + A_S \Delta(t_S) \quad (3)$$

The Fourier transform of equation 3 is, of course, $$a(f) = A_R + A_S e^{j2}_{s} \quad (4)$$

From the Fourier transform one can obtain the intensity of light by squaring both sides of the equation in order to derive $$a(f)^2 = A_R^2 + A_S^2 + 2A_R A_S \cos 2\pi f t_S \quad (5)$$

By substituting the following terms in the above equation $$t_S = \frac{r(X, Y, Z_1)}{V} \quad V = f\lambda \quad K = \frac{2\pi}{\lambda} \quad (6)$$

it can be reduced to the following: $I = a(f)^2 = A_R^2 + A_S^2 + 2A_R A_S \cos Kr(X,Y,Z_1) \quad (7)$ This expression is a seismic hologram and is the same, except for a constant, as would have been obtained with a continuous source of frequency $f$. From an inspection of this equation it can be seen that the intensity will be a maximum whenever $\cos Kr(X,Y,Z_1) = +1$ and a minimum when equal to $-1$. The extremes are given by $$Kr = n\pi \text{ where } n = 0, 1, 2, \ldots \quad (8)$$

Figure 4:
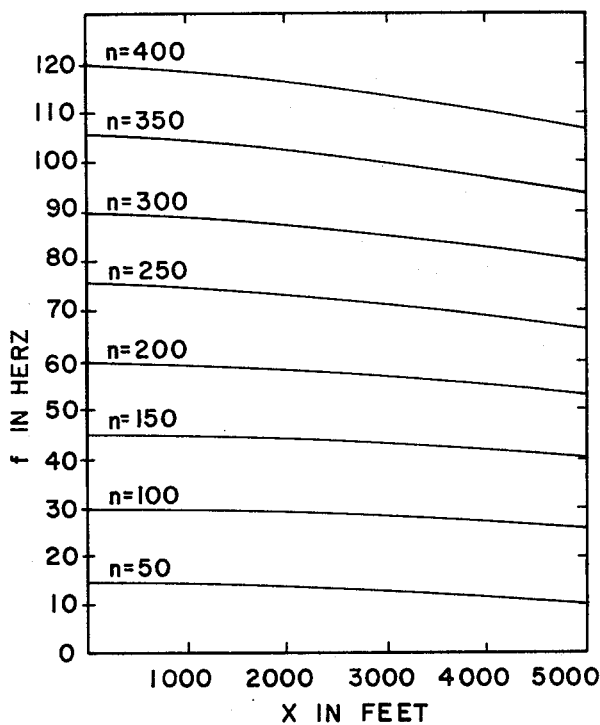
FIGS. 4a and 4b are curves related to the relative intensity of the Fourier transform of the seismic data at various frequencies.
Figure 4:
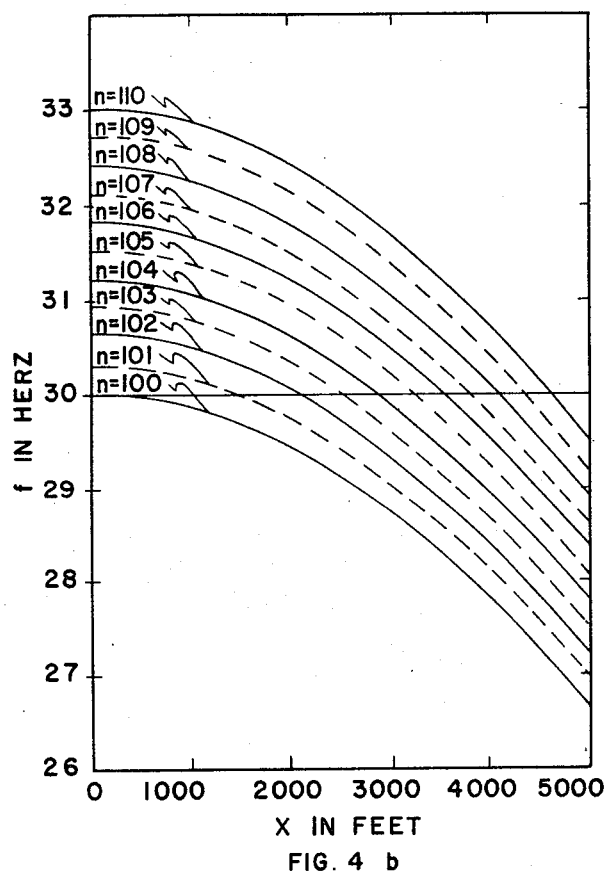
Figure 5:
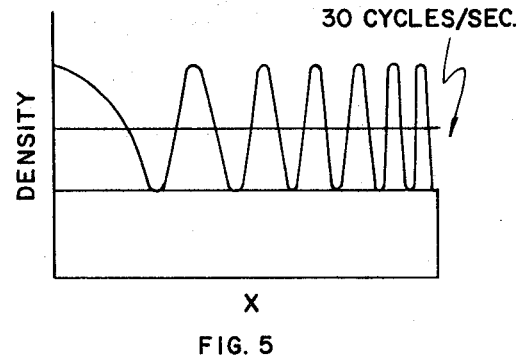
FIG. 5 is a waveform showing the variation in the intensity of the seismic hologram for a selected frequency.

Shown in FIG. 4a is a plot of the upper half of the Fourier plane in FIG. 3 for the case where $Y=0$, $Z_1=5,000$ feet and taking the velocity to be 6,000 ft./sec. Maxima are plotted for intervals of 50 n. FIG. 4b shows an enlarged portion of the Fourier plane with the maxima being shown by solid curves and the minima by dotted or dashed curves. Also FIG. 5 shows the variation in intensity along the line for a frequency of 30 Hz. as a function of X. The maxima occur at even values of $n$ and the minima in intensities occur at odd values of $n$.

Figure 6:
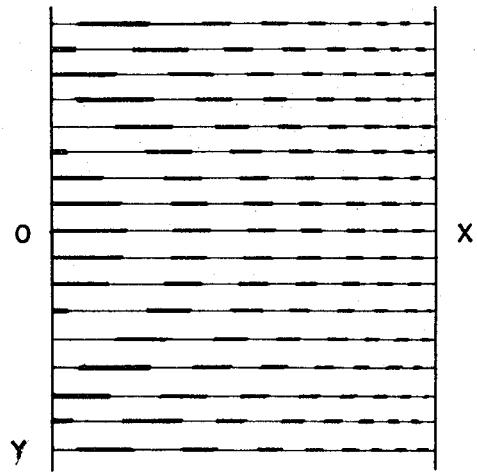
FIG. 6 is a representative example of the type of hologram that will be recorded following the teachings of the present invention.

The above operations are performed for each $tr,X$ plane corresponding to the appropriate values of Y. For a selected frequency $f_1$ a strip of each negative of the $f,X$ plane, where $f=f_1$ is printed photographically on a transparent material to a proper scale corresponding to X and Y scale as shown in FIG. 6. This then will form a holographic negative which may be illuminated with coherent light to reconstruct the three-dimensional image of the point sources that produced the original reflected waves. The reconstructing of the original point source requires the illumination of the negative with coherent light and is more fully described and illustrated in the above-referenced application.

The reconstructions of the holograms described above are reduced by a scale factor which is given approximately by the following:

$$\frac{X_2{}^2}{X_2{}^2} = \frac{\lambda_2 Z_2}{\lambda_1 Z_1} \qquad (9)$$

In equation 9, $X$ represents the distance to the first minimum, the wavelength is $\lambda$ and $Z$ is the half-depth to the image. Since the wavelengths used in the seismic surveys are usually many feet in length, and the visible optical wavelengths are of the order of $2\times10^{-6}$ feet, it will not be possible to reduce the transparency sufficiently to maintain a one-to-one scale for the wavelength ratios. Consequently, the reconstruction will have different vertical and horizontal scales. The vertical scale exaggeration can be reduced by viewing the images space through lenses, but this, of course, will again introduce distortion of the scales.

In the example discussed above, the process was limited to compressional waves from a single reflector. In a real seismic case there will be a large number of reflectors and various types of waves will exist. However, the process will yield a seismic hologram in real cases. The use of a strong, narrow frequency band reference wave improves the signal-to-noise ratio.

A collection of $t,x$ sections depicting suitable reference waves can be made for use with a standard set of geophone interval spacing and line locations which can be superposed and printed together with the proper reduced seismic section to prepare a section for processing as shown in FIG. 7a.

In FIG. 7a the generally vertical lines 40 are traces such as variable area or variable density traces depicting the $t-x$ data of a seismic section display of data from a straight line of equally spaced geophones. The superimposed slanting lines 41 depict the amplitudes and phases of the appearances of a plane continuous wave at the same geophones. The dark areas 48 are portions of a mask, which can be a type conventionally used in optically producing Fourier transforms, which serves to limit the amount of depicted information that is represented in a Fourier transform. Thus, the annotated seismic display may contain $t-x$ data, from shallower or deeper depths, which is excluded by means of the mask.

The reference wave-depicting section can also be printed above (or below) the seismic section as shown in FIG. 7b provided that a fixed time relation is maintained for each section used in constructing the hologram. In FIG. 7b the same $t-x$ data is depicted by generally vertical lines 42 and the same reference wave data is depicted by slanting lines 43. The dark areas 49 represent portions of a mask of the type described above. This separation of the two sections is particularly useful when it is desired to construct a hologram for only a certain time interval. The seismic section can then be masked with a window bounded by hyperbolic curves, such as those defined by edges of dark areas 49, to pass only $t-x$ curves for selected time intervals. It is desirable that the boundaries of the window grade gradually in variable density fashion from clear to opaque to reduce filter-tailing effect of a sharp edge.

A reference signal can be added to the seismic data in conventional data-processing equipment before it is played out in the section camera so that a section can be presented either in the style of FIG. 7a or 7b. For both methods of making the sections, the style of FIG. 7b is to be preferred since no part of the dynamic range of each seismic trace is used for the reference wave.

The holographic record provided by a display of the Fourier transform of a single $t,x$ section can be reproduced by illuminating the display with coherent light. The centers of the reconstructed images will lie on a plane. The image will show the diffraction pattern of the illuminated slit with the maxima on the above-described plane.

FIG. 8 exemplifies a hologram formed by duplicating the Fourier transform of s display of reference line annotated $t-x$ data from a single seismic section. The variable width lines 50 are composed of side-by-side reproductions of a Fourier transform of, for example, the annotated $t-x$ data from the geophones along the line X of FIG. 1. Thus, the lines 50 may be formed by photographically recording the depictions along line X of FIG. 6 on a film that is moved perpendicular to the line so that the variable width lines 50 are composed of side-by-side reproductions of a Fourier transform of, for example, the annotated $t-x$ data from the geophones along the line X of FIG. 1. Thus, the lines 50 may be formed by photographically recording the depictions along line X of FIG. 6 on a film that is moved perpendicular to the line so that the variable width lines 50 are formed by the dark portions of the depictions along the line X.

Conventional seismic sections, such as FIG. 9a, not normal moveout corrected and covering a number of shot points, can be processed to provide optical reconstructions where the patterns of linear images for each shot can be viewed simultaneously. Also, normal moveout corrected sections, such as FIG. 9b, which are equivalent to plane wave illumination of the subterranean structure, can be used to provide optical reconstructions which would separate the diffracted images and images from curved reflectors from the images of plane reflectors. In the latter case the diffraction points and curved reflector images would appear at their proper focal depths while the images from plane reflectors would appear at infinity.

It is sometimes useful to pick certain reflections on the $t-x$ sections by marking them before reduction. These selected arrival times can then be traced so that a section with simulated delta functions is obtained. The preparation of holograms from these sections may be made for high spatial frequencies and their optical reconstructions are the equivalent of computing the three-dimensional location of the apparent seismic images.

In all of the holograms described, the images are reconstructed in a space of constant refractive index. In the earth the velocity of the waves and hence the refractive index is a function of position. For relatively simple velocity distributions, when known from velocity surveys in boreholes, corrections to the curvature of seismic arrival times with distance as a function of arrival time can be computed and corrections applied prior to construction of the $t-x$ profiles. Holograms constructed from such $t-x$ sections and optically reconstructed provide an image space where the relative position of the images are corrected for the refractive index variations.

In FIGS. 9a and 9b variable area seismic records, represented by lines 34 and 35, respectively, and simple types of reference waves represented by lines 36 and 37, respectively, are shown for simplicity in drafting. Dark areas 41 and 42 represent portions of masks of the type described above. It is to be understood that variable density seismic records and more complicated reference waves can be employed. In many cases the variable density type of record section is preferable to the variable area record section.

While only the process of constructing an optical hologram has been described, an optical multiprocessor, such as those which are currently available, can be used to filter the section in a two-dimensional Fourier plane prior to constructing the seismic hologram.

While the optical system illustrated in FIG. 3 shows only lenses and photographic transparencies, the equivalent optical system using mirrors and reflecting replicas can equally well be used to carry out the processes of this invention. A system which uses reflection optics is described in the copending patent application Ser. No. 451,795, filed Apr. 29, 1965 (P8563) and such a system can be used in practicing the present invention.

In constructing holograms for waves other than seismic waves, it is to be understood that suitable corrections to the arrival times of the waves are often desirable, in order to reduce the observations to a chosen datum, thus eliminating irregularities due to the location and environment of the individual receivers. Such corrections can be made prior to the construction of a visible display of the $t-x$ data.

I claim as my invention:

1. A method of forming a holographic record of wave energy which comprises the steps of:
   visibly depicting along one coordinate of a display (a) the amplitude with time of appearances of waves that are reflected and diffracted from an object and propagate toward a line of receiving stations and (b) the amplitudes and phases of appearances of a reference wave at the same receiving stations;

visibly depicting along an orthogonal coordinate of the same display the order and spacing of said receiving stations with distance along said line of receiving stations;

one of said displays of depicted wave appearances and receiving station spacings being produced for each of a plurality of laterally spaced lines of receiving stations;

diffracting parallel, coherent light from said display and through a focusing means that is arranged to produce a one-dimensional Fourier transform along the time dimension;

visibly recording the intensity of said Fourier transform with respect to both a selected frequency and distance along the line of the receiving stations from which the Fourier transform was produced;

said intensities of the Fourier transforms of each of said displays being visibly recorded along one coordinate of a display in which the order and spacing of said laterally spaced lines of receiving stations are visibly recorded along an orthogonal coordinate.

2. The process of claim 1 in which said wave energy is seismic wave energy.

3. The process of claim 1 in which said depictions of wave appearances are corrected for variations in the location and environment of the individual receiving stations.

4. The process of claim 1 in which said depictions of appearances of reflected and diffracted waves are displaced along the time coordinate from said depictions of appearances of the reference wave.

5. The process of claim 1 wherein the same pattern of receiving station spacing is maintained with respect to the receiving stations in each of said lines of receiving stations; and said depictions of appearances of a reference wave are prepared for duplication on each of said displays of depicted wave appearances.

6. The process of claim 5 in which said depictions of appearances of said reference wave are inclusive of the appearances of a plurality of reference waves.

7. The process of claim 5 wherein:

said preprepared depictions of said reference wave include those of differently directed reference waves; and said Fourier transforms are produced with respect to each of said differently directed reference waves.

8. A process of forming and reconstructing a holographic image which comprises the steps of:

diffracting parallel coherent light from a display that contains visible depictions of appearances of both waves that are reflected and diffracted toward at least one line of receiving stations and appearances of at least one reference wave at said receiving stations along one coordinate and visible depictions of the order and spacing of said line of receiving stations along an orthogonal coordinate, with said diffracted light being passed through a focusing means arranged to produce a one-dimensional Fourier transform along a time domain;

visibly recording the intensity of said Fourier transform with respect to both a selected frequency and distance along said line of receiving stations; and diffracting parallel coherent light from said recorded Fourier transform to reconstruct a holographic image.

9. The process of claim 8 in which said recording of a Fourier transform and said reconstruction of a holographic image are conducted with respect to at least two frequencies.

* * * * *